United States Patent Office 3,578,419
Patented May 11, 1971

3,578,419
SCRAP NUCLEAR FUEL MATERIAL
RECOVERY PROCESS
Richard K. Welty, Murrysville, Pa., assignor to
General Electric Company
Filed Dec. 14, 1967, Ser. No. 690,635
Int. Cl. C01g 1/02, 43/02
U.S. Cl. 23—317                                    4 Claims

ABSTRACT OF THE DISCLOSURE

An improved process for recovering hard scrap nuclear reactor fuel material is disclosed. In the preparation of fuel pellets, a significant quantity of scrap nuclear fuel material which has been pressed and sintered is produced. In the disclosed process, the scrap is first oxidized in a fluidized bed method which simultaneously oxidizes and comminutes the scrap, then, if desired, the oxidized material is reduced back to the original chemical form with improved sinterability.

BACKGROUND OF THE INVENTION

In a typical nuclear reactor, a large quantity of heat energy is produced by controlled nuclear fission of fissionable isotopes, such as $U^{233}$, $U^{235}$, $Pu^{239}$ and $Pu^{241}$. This energy is released as heat from a chain reacting structure or reactor core containing nuclear fuel elements. This heat is removed to produce useful work by passing a coolant through the core. Typical nuclear reactors include those described in the book, "Nuclear Power Plants," by R. L. Loftness, D. Van Nostrand Company, New York (1965).

Oxides of naturally occurring uranium, containing about 0.7% fissionable $U^{235}$ in $U^{238}$, may be used in some nuclear reactors. Generally, however, the $U^{235}$ content of the fuel is increased to about 2–3%. In addition, other fissionable isotopes, such as $Pu^{239}$ and $Pu^{241}$ or fertile materials such as $Th^{232}$ and $Pu^{240}$ may be included in the fuel.

The fuel material is generally enclosed in a container or cladding of a corrosion resistant material such as a zirconium alloy or stainless steel.

The clad may be in the form of a tube having a length greater than 10 feet and a diameter less than 0.5 inch. A typical fuel rod consists of such a tube filled with nuclear fuel in the form of granules or pellets. Fuel pellets are often preferred since they have higher density and do not tend to settle during use. Fuel pellets are generally prepared by milling enriched $UO_2$ particles to an average diameter of less than 5 microns, cold pressing to form a green or unsintered solid body having a density of about 40% of the theoretical maximum density and then sintering the pellet at a high temperature to produce a sintered pellet having a density above 90% of the theoretical maximum. The pellets must then be ground to a diameter which permits easy loading into the clad, but does not leave an undesirably large gap between the pellet and the tube walls. This grinding process produces a significant amount of hard scrap fuel, primarily $UO_2$, which is not suitable for direct resintering. Also, during sintering some pellets slump or deform into an "hourglass" shape having a central area too narrow for use. Other pellets chip, crack or crumble during handling and sintering. Thus, there is a considerable amount of hard-sintered scrap resulting from the fuel manufacturing process. This material is both expensive and slightly radioactive, so that it cannot be economically discarded. The hard-sintered particles, even after being ground to a powder, are not suitable for resintering. It is very difficult to grind hard fuel scrap to the very small particle size required for pressing and sintering. Also, the ground scrap does not sinter well to as high density particles as is desirable. It is necessary that $UO_2$, for example, be oxidized to $U_3O_8$ and then reduced back to $UO_2$ under carefully controlled conditions in order to produce a light, easily pressed and sintered material. In the past, this processing has been accomplished on a batch basis. The scrap has been oxidized in small amounts in boats in a tube furnace, followed by chemical reduction and particle size reduction. This method is slow, inefficient and often results in incomplete chemical conversion in the boats. Variations in product characteristics, such as hardness, often occur from batch to batch.

Thus, there is a continuing need for improved processes for recovering and reusing scrap nuclear fuel material.

SUMMARY OF THE INVENTION

It is, therefore, an object of this invention to provide nuclear fuel recovery process overcoming the above-noted problems.

Another object of this invention is to provide a continuous process for recovering scrap nuclear fuel material.

Another object of this invention is to provide a process for treating scrap nuclear fuel material which simultaneously comminutes and oxidizes the material.

Still another object of this invention is to provide a process for converting hard scrap $UO_2$ to $U_3O_8$ which achieves substantially complete conversion.

The above objects, and others, are accomplished in accordance with this invention by feeding the scrap nuclear fuel particles into a fluidized bed reactor while an oxidizing gas, such as air, is fed into the bottom of the reactor at an oxygen flow rate of at least twice stoichiometric. Gas flow is adjusted so that the largest particles do not fluidize, but settle to the bottom of the reactor and form a fixed bed section. Near the top of this fixed bed section, the reactor walls are preferably heated to aid in oxidation of the fuel material. During this oxidation, the particles in the fixed bed begin to break up into smaller and smaller pieces, apparently due to oxygen diffusion into the crystal lattice. At a certain intermediate particle size the particles become small enough to begin to fluidize; that is, they are supported by the gas stream and become free to move in random directions. At this point, excellent heat transfer and gas-solids contact are possible, assuring complete oxidation. As the particles become still smaller, they reach a point where they are no longer in equilibrium with the fluidizing gas and are pneumatically transported out of the top of the reactor. The finely-divided oxidized fuel particles are then separated from the gas stream; for example, by means of a cyclone separator.

It has been found that product hardness, particle size, degree of oxidation, etc., may be easily varied by varying gas composition, rate of gas flow and reactor temperature. Also, it has been found that these particles may then be easily chemically reduced to produce a highly sinterable fuel powder. In order to obtain complete conversion of the scrap to the higher oxide, e.g., from $UO_2$ to $U_3O_8$, it is necessary that the flow of oxidizing gas be such as to provide at least twice the stoichiometric quantity of oxygen necessary for the oxidation reaction. It is preferred that the oxygen in this gas be even higher, up to about 10 times stoichiometric, to assure complete conversion at high system through-put rates.

While this process is especially suitable for $UO_2$ fuels, either enriched or natural, it is also suitable for fuels which include other materials, such as $PuO_2$ or $ThO_2$, or for fuels which consist of oxides of fissionable materials other than uranium.

BRIEF DESCRIPTION OF THE DRAWINGS

Details of the invention will be further understood upon reference to the drawing, in which.

DETAILED DESCRIPTION OF THE INVENTION

Figure 1:
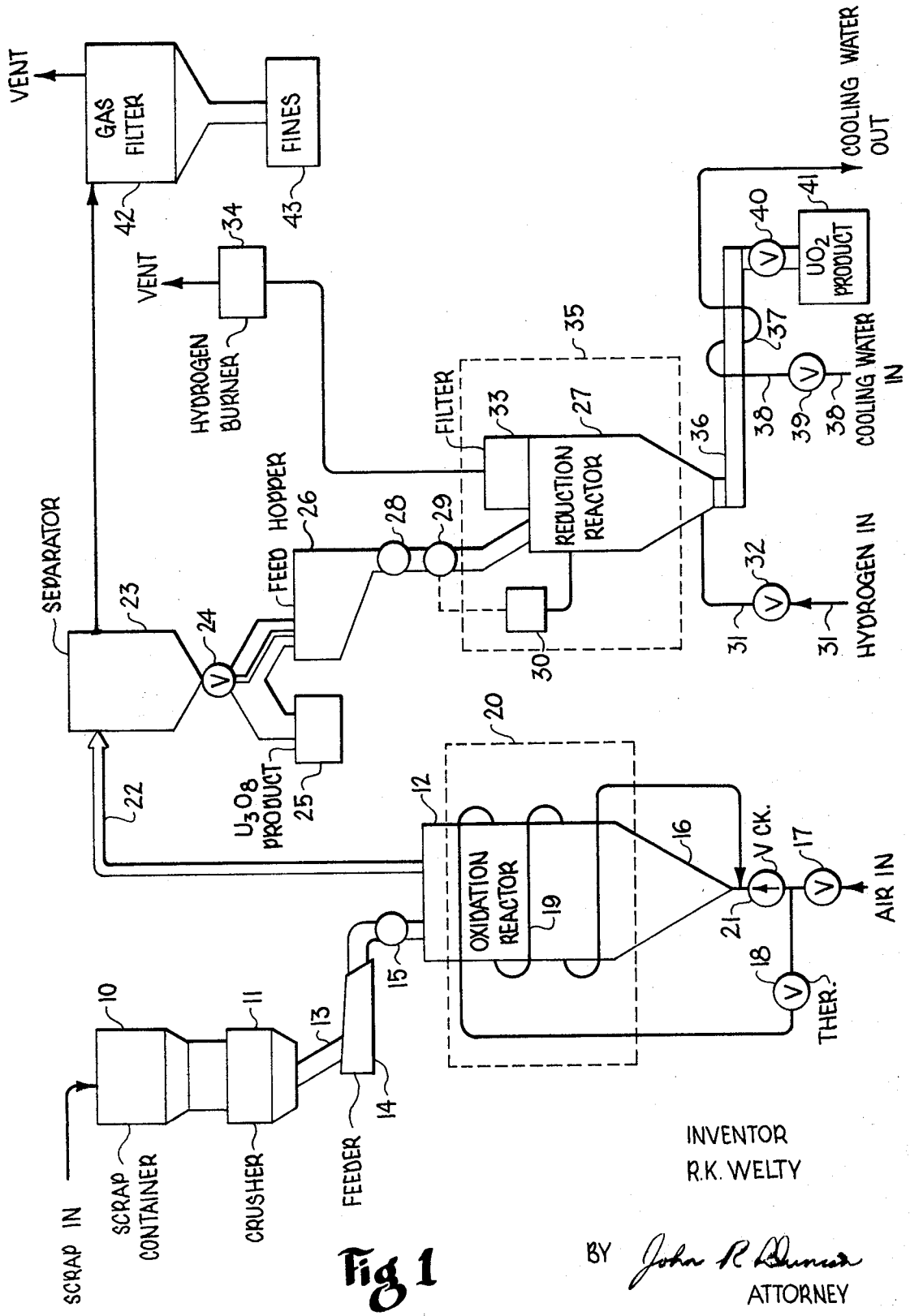
FIG. 1 shows a simple schematic flow sheet of the process for converting hard scrap fuel into sinterable material.

Referring now to FIG. 1 there is shown a simple schematic flow diagram for a process which first converts hard scrap $UO_2$ to a millable $U_3O_8$ and then, if desired, reduces the $U_3O_8$ to a millable form of $UO_2$, suitable for repressing and resintering into nuclear fuel pellets.

In this process, hard scrap $UO_2$, which may be in the form of grinding residue, defective pellets, etc., is conveyed into a scrap cntainer 10. The larger pieces of scrap are then crushed by hard scrap crusher 11 to an average diameter of less than about 0.1 inch, suitable for introduction into the oxidation reactor 12. The crushed scrap particles pass from crusher 11 through gravity chute 13, feeder 14 and valve 15 to oxidation reactor 12. While FIG. 1 shows the hard scrap particles being introduced into the top of oxidation reactor 12, this is merely illustrative and the particles could be fed into oxidation reactor 12 through either the side or bottom, if desired. As the particles enter oxidation reactor 12, they meet an upward flow of an oxidizing gas, such as air, entering oxidation reactor 12 at the apex of conical bottom 16. Generally, where the oxidizing gas is air, a total flow of from about 10 to about 20 c.f.m. is suitable in a reactor having a diameter of about 6 inches. Desirably, the air is at a temperature of from about 400 to about 600° F. and has a flow rate of about 1.33 ft./sec. These conditions give optimum oxidation with effective fluidization of the particles. The oxidizing gas from any suitable source (not shown) passes first through valve 17. A porton of the gas is diverted through thermostatic valve 18 to a coil 19 which surrounds the shell of oxidation reactor 12. A furnace surrounds the central portion of oxidation reactor 12 and coil 19. This furnace may be of any conventional design and is not shown in detail. However, the area heated is indicated by dashed box 20. The furnace may maintain oxidation reactor 12 at any suitable temperature. Complete oxidation together with economical use of heat has been obtained with furnace temperatures in the range from about 800 to about 1300° F. Optimum results have been obtained where the furnace temperature is in the range of about 825 to about 875° F. The undiverted portion of the gas passes through check valve 21, after which it is mixed with the heated diverted gas and the mixture enters the oxidation reactor. Thermostatic valve 18 controls the proportion of the gas which is heated so that the gas entering the oxidizing reactor is at the desired temperature. As discussed above, the temperature of the gas, the rate of gas flow and the temperature of the oxidizing reactor are adjusted so that completely converted particles of $U_3O_8$, having the desired particle size leave the oxidizing reactor. If the temperatures are too low and/or the rate of gas flow too high, larger incompletely converted particles leave the reactor. If the temperatures are too high, and/or the rate of gas flow too low, the process will be unnecessarily slow and wasteful of energy. In general, best results are obtained when the fluidized bed height is from about 2.5 to about 3.5 times the diameter of the oxidization reactor, and the freeboard (between the top of the fluidized bed and the top of the reactor) and the height of the fluidized bed are about equal.

When oxidizing reactor 12 is operated correctly, very small particles of $U_3O_8$ are entrained in the gas and continuously pneumatically carried by the exiting gas stream through line 22 to separator 23. Separator 23 may be any conventional gas-solid separator, such as a cyclone. Entrained particles settle to the bottom of separator 23. They may be passed by pneumatic diverter valve 24 either to $U_3O_8$ product container 25 or to feed hopper 26 for further processing. It has been found that up to about 15% sinterable $U_3O_8$ may be mixed with sinterable $UO_2$, pelleted, and centered in a reducing atmosphere to give a desirable $UO_2$ compact. Also, this $U_3O_8$ product from container 25 may be mixed with $UO_2$ to give a product having an average ratio of oxygen atoms to uranium atoms of greater than 2, which is desirable for several applications.

On the other hand, where it is desired to convert the $U_3O_8$ to $UO_2$ diverter valve 24 directs the $U_3O_8$ to feed hopper 26, from which it passes to reduction reactor 27 through valve 28 and metering valve 29. The rate of feed of $U_3O_8$ to reduction reactor 27 is controlled by level measuring means 30 which controls metering valve 29. A reducing gas, such as hydrogen or dissociated ammonia is fed into the lower portion of reduction reactor 27 through line 31 and valve 32. As the hydrogen passes up through the particles, water is formed by the reduction reaction. The water and remaining gas exits though filter 33 to hydrogen burner 34. It is necessary that filter 33 be kept at a sufficiently high temperature to prevent water vapor from condensing therein. The reduction reactor 27 is kept at the desired temperature, preferably in the range of from about 1300 to about 1400° F. by means of a surrounding conventional furnace, which is schematically indicated by dashed box 35. The reduction reactor may typically be a 6″ counter flow tube furnace with external wall heat, maintained at a temperature of from about 1150 to about 1350° F. Preferably, the gas flow should include about 40 ft.$^3$/min, hydrogen to insure complete reduction. As the reduction reaction progresses, the product $UO_2$ is removed from the bottom of the reduction reactor by discharge means 36. The $UO_2$ product is cooled by a cooling coil 37 to which a cool liquid, such as water, is fed through line 38 and valve 39. The $UO_2$ product is cooled to prevent reoxidation in ambient air as the product passes through valve 40 to $UO_2$ product container 41. This $UO_2$ product is now suitable for resintering into nuclear fuel pellets. If desired, the size of these $UO_2$ particles may be further reduced by milling, such as in a conventional jet mill.

The gas stream from separator 23, which may contain a small amount of very fine $U_3O_8$ particles, is passed to a gas filter 42 where these fines are separated and directed to fines container 43. These $U_3O_8$ fines may then be conveyed to either $U_3O_8$ product container 25 or feed hopper 26 for conversion to $UO_2$, as desired.

While this process has been described in relation to the recovery of $UO_2$ hard scrap, it should be remembered, as pointed out above, that the scrap may include other compositions, such as $ThO_2$ or $PuO_2$, or could be entirely another hard scrap nuclear reactor fuel, such as entirely hard scrap $PuO_2$.

Figure 2:
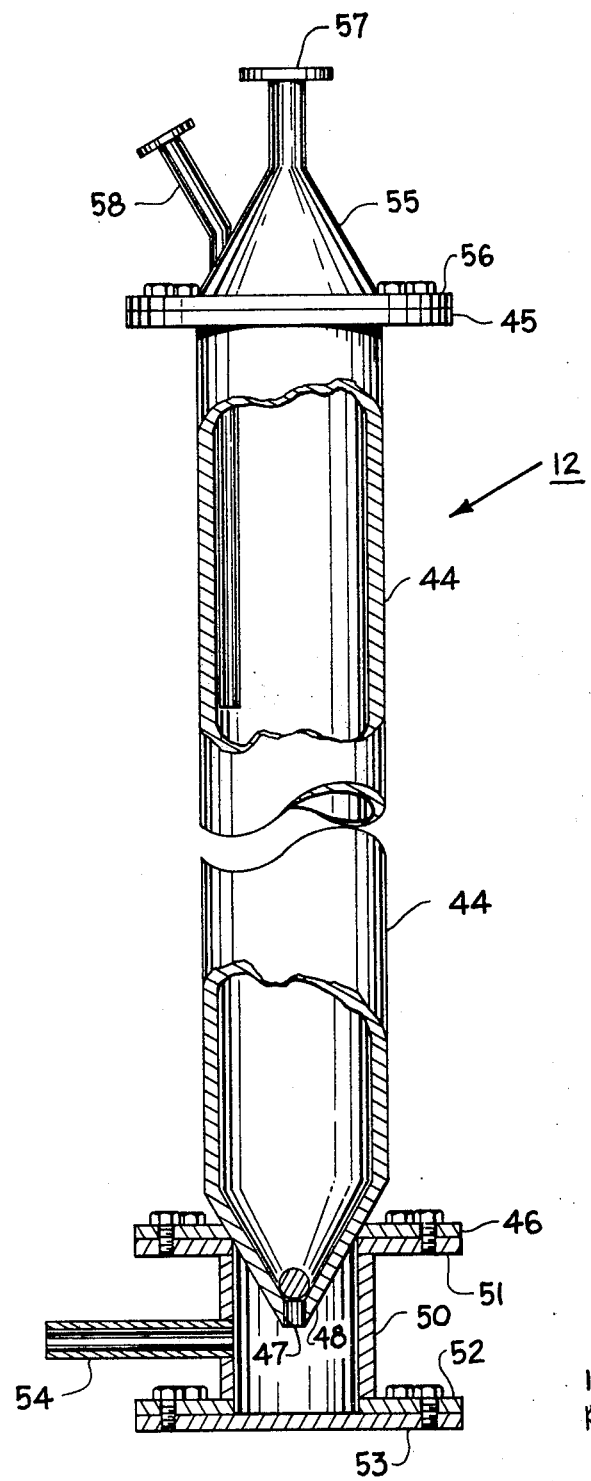
FIG. 2 shows a fluidized bed reactor, partly broken away, useful in the process of this invention.

FIG. 2 shows a schematic representation, partly cut away, of a preferred embodiment of the oxidation reactor, such as that shown at 12 in FIG. 1.

The oxidation reactor 12 consists primarily of a cylindrical body section 44, shown somewhat shortened in FIG. 2. Body 44 should have a diameter of less than about 10 inches to prevent the accumulation of a critical mass of fissionable material therein. At the ends of body 44 are upper and lower flanges 45 and 46, respectively. The ratio of the length of body 44 between flanges 45 and 46 to the diameter of body 44 should generally be from about 5:1 to about 7:1. Within body 44, the top of the fluidized bed should preferably be about halfway between flanges 45 and 46. Thus, the height of the fluidized bed and the freeboard above the bed are about equal.

Cylindrical body 44 has a conical extension 47 extending past flange 46 at its lower end with an opening 48 at the apex. A ball check valve 49 is placed over opening 48 to prevent loss of fuel particles through opening 48. Ball 49 also serves to distribute incoming gases through the lower fixed particle bed, aiding in obtaining uniform gas-particle contact. A gas admission chamber 50 encloses the apex of cone 47 and opening 48. Chamber 50 is cylindrical in cross section, with flange 51 mating with lower flange 46 of body 44. At the lower end of chamber 50 a flange 52 mates with a bottom plate 53. Bottom plate 53 is easily removable to permit cleaning from chamber 50 of any particulate material which may fall through opening 48. A tube 54 penetrates the side wall of chamber 50 so that the oxidizing gas may be passed to the fluidized bed through opening 48.

A conical header 55 is attached to upper flange 45 by means of mating flange 56. At the apex of header 55 there is provided an outlet opening 57 to permit the gas carrying finely divided oxidized particles to the particle collector 23 as shown in FIG. 1. Hard scrap fuel particles are introduced into the oxidation reactor 12 through tube 58 penetrating through header 55. Tube 58 penetrates a substantial distance down into cylindrical body 44 to deliver the particles near the top of the fluidized bed.

In operation, particles of hard scrap nuclear fuel are introduced into oxidation reactor 12 through tube 58 while a heated oxidizing gas is introduced through tube 54. The central portion of body 44 is heated to increase the rate of oxidation. Largest particles remain at the bottom of the oxidation reactor. As particles oxidize, they simultaneously fracture. As particles become completely oxidized, their size becomes small enough that the gas stream carries them out of the oxidation reactor through opening 57. Oxidation and comminution is thus carried on continuously.

DESCRIPTION OF A PREFERRED EMBODIMENT

Details of a preferred embodiment of the invention will be further understood upon reference to the following detailed example. Parts and percentages are by weight unless otherwise indicated.

Example

An oxidation-reduction system is constructed according to tne schematic flow sheets shown in FIG. 1, using an oxidation reactor such as is shown in FIG. 2.

The cylindrical body of the oxidation reactor has a length of about 40 inches and a diameter of about 6 inches. The air inlet opening in the conical lower section of the reactor has a diameter of about 0.5 inch, with a 0.075-inch diameter ball on the interior of the cone. The particle feed tube extends about 12 inches into the cylindrical body of the oxidation reactor to about the upper surface of the fluidized bed. The opening in the upper end of the oxidation reactor has a diameter of about 2 inches. All parts of the oxidation and reduction reactors and associated piping are constructed of Type 316 stainless steel.

About the lower 40 inches of the cylindrical body is heated by means of a surrounding furnace at a temperature of about 850° F., ±25° F. Air enters the oxidation reactor at a flow rate of about 1.33 ft./sec. at a temperature of about 500° F. The air is heated by circulation on the outside of the furnace, to give the desired entering temperature. Total air flow is about 15 cubic feet/minute.

Hard scrap nuclear fuel particles, in this case $UO_2$ containing about 2% $U^{235}$ and about 98% $U^{238}$, crushed to −8 mesh, are fed into the top of the oxidation reactor at a rate of about 20 lbs./hr. This feed and air flow are adjusted as necessary to maintain the level of the fluidized bed at about 20 inches above the bottom of the cylindrical body.

Gas carrying particles of $U_3O_8$ exits the top of the oxidation reactor and passes to a cyclone separator. About 20.8 lb./hr. of the $U_3O_8$ particles having an average diameter of about 6 to 8 microns are collected. These particles may be sent to a $U_3O_8$ product container or to a feed hopper for reduction to $UO_2$. The gas stream leaving the cyclone is directed to a gas filter. Very fine $U_3O_8$ particles are removed, with the gas exiting through a vent. All but about 0.001% of the $U_3O_8$ is removed in the cyclone separator and gas filter. The fine $U_3O_8$ particles may be returned to either the $U_3O_8$ product container or the reduction reactor feed hopper, as desired.

Where the reduction to $UO_2$ is desired, the $U_3O_8$ particles are fed into the top of a counter flow bed reactor having a diameter of about 6 inches and a height of about 48 inches at a rate of about 20 lb./hr. The reactor is surrounded by a furnace which maintains the reduction reactor at a temperature of about 1350° F. Hydrogen gas is fed into the reduction reactor adjacent the cylindrical wall near the lower end of the reactor. Particles of the $UO_2$ product are continuously removed from the bottom of the reduction reactor, while the remaining hydrogen and water vapor produced in the reduction reaction pass from the top of the reactor through a filter, and a hydrogen burner to a vent. The filter is kept at a temperature above about 212° F. to prevent condensation of water therein. The $UO_2$ particle discharge conveyer is cooled by cold water cooling coils to ambient temperature so as to prevent later undesired oxidation. The $UO_2$ product is collected in a container from which it may be taken for resintering into fuel pellets. If desired, the particle size of the $UO_2$ product may be further reduced, as by jet milling. The $UO_2$ product is easily sintered, and is easily milled. The original hard scrap $UO_2$ was difficult to mill and produced poor pellets when directly resintered.

Although specific components and proportions have been described in the above description of preferred embodiments, other suitable materials, components, temperatures, etc. may be used with similar results, as indicated above. In addition, other materials may be included in the hard fuel scrap or in the oxidizing and reducing gas stream to enhance or otherwise modify their properties.

Other modifications and ramifications of the present invention will occur to those skilled in the art upon reading the present disclosure. These are intended to be included within the scope of this invention.

What is claimed is:

1. A process for reclaiming hard nuclear fuel scrap material which comprises:
   (a) feeding particles of scrap nuclear fuel comprising a composition selected from the group consisting of $UO_2$, $PuO_2$ and mixtures thereof, into a fluidized bed reactor;
   (b) feeding an oxygen containing gas at a temperature from about 400 to about 600° F. into the lower end of said reactor, said gas containing from about 2 to about 10 times the stoichiometric amount of oxygen theoretically required to complete the oxidation reaction;
   (c) maintaining said reactor at a temperature in the range of from about 800 to about 1300° F. whereby said particles are continuously simultaneously comminuted and oxidized to a higher oxide state;
   (d) controlling the flow of said gas into said reactor so that the largest substantially unoxidized particles are not fluidized, medium sized partially oxidized particles are fluidized and smallest substantially completely oxidized particles are carried out of the top of said reactor by said gas; and
   (e) separating said smallest particles from said gas after they have been carried from said reactor by said gas.

2. The process of claim 1 including the further step of contacting said smallest particles with a hydrogen containing gas at an elevated temperature to reduce the oxide back to the original oxide state, whereby finely divided, millable, sinterable particles are produced.

3. The process of claim 2 wherein said elevated temperature is in the range of from about 1150 to about 1350° F.

4. The process of claim 1 wherein said fluidized bed reactor has an inside diameter of less than about 10 inches, an inside height from about 5 to about 7 times the inside diameter of said reactor and said particles of scrap nuclear fuel are fed into said reactor at a rate sufficient to maintain said fluidized bed surface at about the midpoint of said height.

References Cited
UNITED STATES PATENTS

| | | | |
|---|---|---|---|
| 3,140,151 | 7/1964 | Foltz et al. | 23—355 |
| 3,343,926 | 9/1967 | Knudsen et al. | 23—355 |

CARL D. QUARFORTH, Primary Examiner

F. M. GITTES, Assistant Examiner

U.S. Cl. X.R.

23—354, 355